United States Patent
Eoff et al.

(10) Patent No.: US 11,407,934 B2
(45) Date of Patent: Aug. 9, 2022

(54) DEGRADABLE DIVERSION MATERIAL HAVING A POLYACRYLATE COMPOUND

(71) Applicant: HALLIBURTON ENERGY SERVICES, INC., Houston, TX (US)

(72) Inventors: Larry Steven Eoff, Porter, TX (US); Aaron Michael Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

(21) Appl. No.: 16/968,130

(22) PCT Filed: Mar. 21, 2018

(86) PCT No.: PCT/US2018/023596
§ 371 (c)(1),
(2) Date: Aug. 6, 2020

(87) PCT Pub. No.: WO2019/182587
PCT Pub. Date: Sep. 26, 2019

(65) Prior Publication Data
US 2021/0363415 A1  Nov. 25, 2021

(51) Int. Cl.
| | |
|---|---|
| *E21B 33/138* | (2006.01) |
| *C09K 8/88* | (2006.01) |
| *C09K 8/03* | (2006.01) |
| *C09K 8/035* | (2006.01) |
| *C09K 8/84* | (2006.01) |
| *C09K 8/92* | (2006.01) |

(52) U.S. Cl.
CPC ............. *C09K 8/882* (2013.01); *C09K 8/032* (2013.01); *C09K 8/035* (2013.01); *C09K 8/845* (2013.01); *C09K 8/92* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 4,622,356 A | 11/1986 | Jarovitzky et al. | |
| 7,775,278 B2 | 8/2010 | Willberg et al. | |
| (Continued) | | | |

FOREIGN PATENT DOCUMENTS

| | | | |
|---|---|---|---|
| WO | 2017006077 A1 | | 1/2017 |
| WO | WO 2017/086905 | * | 5/2017 |
| WO | 2017106077 A1 | | 6/2017 |

OTHER PUBLICATIONS

International Search Report and Written Opinion; PCT/US2018/023596; dated Dec. 20, 2018.

*Primary Examiner* — Andrew Sue-Ako
(74) *Attorney, Agent, or Firm* — Polsinelli PC

(57) ABSTRACT

Disclosed herein are degradable diverter materials comprising a polyacrylate compound. In particular, the degradable diverter material may be a particulate with each individual particle being having a polyacrylate compound and optionally at least one inert filler. The degradable diverter material may be introduced into a wellbore penetrating a subterranean formation. The degradable diverter material may then be allowed to divert at least a portion of fluid present downhole, the fluid being introduced from the surface or already present downhole. The degradable diverter material can then be allowed to at least partially degrade via dissolution.

10 Claims, 2 Drawing Sheets

(56) References Cited

U.S. PATENT DOCUMENTS

| | | |
|---|---|---|
| 2004/0261996 A1 | 12/2004 | Munoz et al. |
| 2010/0093891 A1 | 4/2010 | Li et al. |
| 2014/0054039 A1* | 2/2014 | Chang .................... C09K 8/885 |
| | | 166/293 |
| 2014/0174737 A1 | 6/2014 | Reddy et al. |
| 2015/0315886 A1* | 11/2015 | Potapenko .......... C04B 20/0096 |
| | | 166/305.1 |
| 2018/0258344 A1* | 9/2018 | Holtsclaw ................ C09K 8/92 |

* cited by examiner

DEGRADABLE DIVERSION MATERIAL HAVING A POLYACRYLATE COMPOUND

CROSS-REFERENCE TO RELATED APPLICATIONS

This application is a national stage entry of PCT/US2018/023596 filed Mar. 21, 2018, said application is expressly incorporated herein by reference in its entirety.

FIELD

The present disclosure relates to degradable diversion material for use in subterranean regions.

BACKGROUND

During various stages in the development, stimulation and production of hydrocarbons it is often necessary to control the flow of various subterranean fluids. Accordingly, diversion materials are often introduced downhole to reach various subterranean locations to affect the flow of fluids. The diversion materials can prevent the flow of fluids to unwanted locations, divert flow to desirable locations, or prevent loss of fluids from the wellbore into desired subterranean zones, among other functions. Additionally, after diverting fluid flow, it may be desirable to remove the diverting material from the well, either to permit flow again, or to prevent harm to the environment or wellbore.

Many types of diverters are currently being used, some of which are considered non-degradable. These non-degradable diverters are used to permanently prevent flows of materials into unwanted subterranean locations. Degradable diverters are more prominently used in the subterranean locations currently. These degradable diverters form a temporary block on unwanted subterranean locations allowing the fluids to divert to more desirable subterranean locations. After the degradable diverters have been used, these diverters can be degraded or hydrolyzed which opens the plugged zone back up.

One of the more common oil and gas processes includes hydraulic fracturing. In a typical hydraulic fracturing treatment, a treatment fluid often referred to as a "fracturing fluid" is pumped through a wellbore and into a subterranean formation producing zone at a rate and pressure such that one or more fractures are formed or extended into the zone. The fracturing fluid can include various additives such as proppants, surfactants, inhibitors, etc. which are introduced into the fractures.

BRIEF DESCRIPTION OF THE DRAWINGS

Implementations of the present technology will now be described, by way of example only, with reference to the attached figures, wherein.

DETAILED DESCRIPTION

Figure 1:
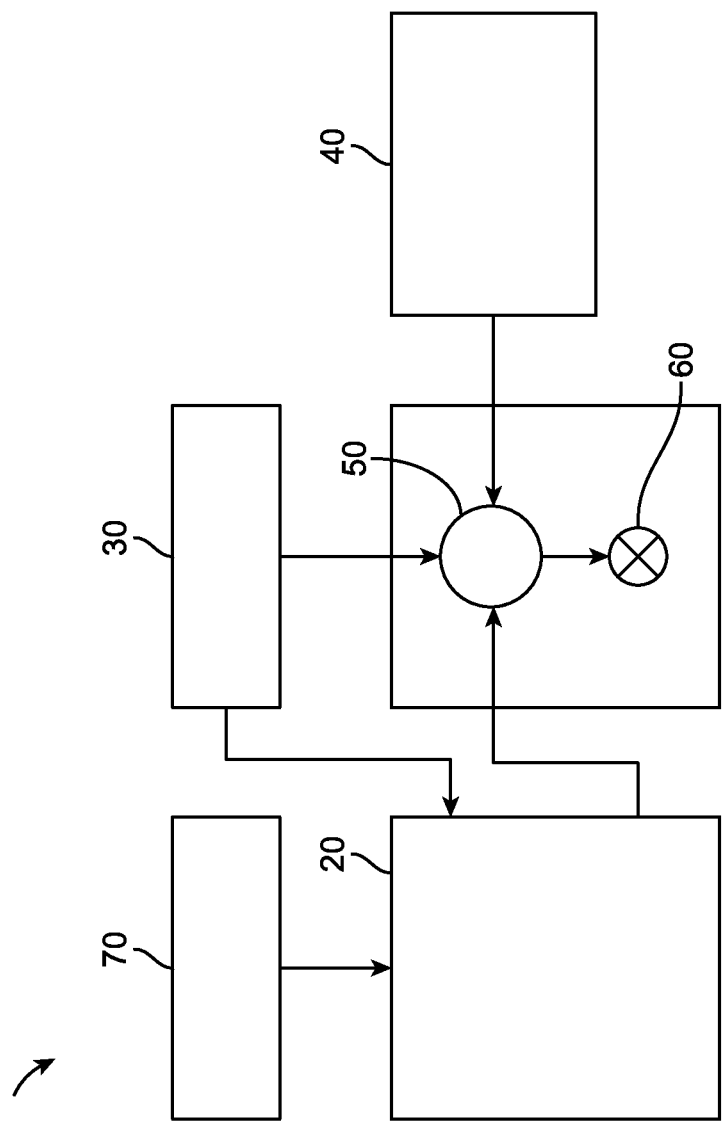
FIG. 1 is a diagram illustrating an example of a fracturing system that may be used in association with certain aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

Disclosed herein are compositions, systems and methods for diverting at least a portion of fluid downhole using a degradable diverter material comprising a polyacrylate compound (also referred to herein as "diverter material"). The diverter material composition may be provided in particulate form and may be injected into a wellbore as a solid, semi-solid, or a gel. These diverter material compositions may be mixed with a carrier fluid to form a homogeneous solution or a heterogeneous mixture. The diverter material compositions disclosed herein may have the benefit of being cost effective, non-toxic and eco-friendly.

The carrier fluid for the diverter material composition disclosed herein includes any fluid where the diverter material (or the polyacrylate in the diverter material) is initially insoluble during mixing and injection downhole and for sufficient time to form a plug, or other diversion, within a wellbore, fracture, perforation or other downhole location. The diverter material may after a period of time, such as sufficient time to perform some well treatment such as a fracturing process, degrade and return back to the surface. The carrier fluid may be an aqueous fluid and may include a salt, such as a divalent salt. Accordingly, any divalent brine fluid may be employed as carrier fluid. The carrier fluid may be saturated or have sufficiently high concentration such that the diverter material is at least partially insoluble for mixing, injection and forming a diversion downhole. Downhole the carrier fluid may dilute in the presence of native aqueous fluid already downhole in the formation or wellbore, or dilute water having low concentrations of salts pumped from the surface.

Once injected downhole, the degradable polyacrylate diverter material proceeds to one or more of a wellbore, perforation or fracture in a wellbore and diverts the flow of fluids. Diversion herein may include any full or partial obstruction or redirection of fluid in a subterranean region, including the wellbore, fracture, or formation. The diversion material may agglomerate together to form a barrier or obstruction for fluid. For instance, the diversion material may form a plug in any one of a perforation, fracture, or the wellbore. The formation of a plug includes bridging, where large particles form across a fracture, followed by smaller particles plugging the openings of the larger particles until all openings are closed thereby forming an impermeable block. The diversion material may also form a filter cake along the surface of the formation for instance in one or more of the fractures. Accordingly, whether forming a plug or a filter cake, or other obstruction, the diversion material acts to divert fluid downhole. Once the diversion operation is complete, the diversion materials degrade via dissolution in the presence of water based or aqueous based fluid where these materials are easily recovered.

(a) Degradable Diverter

Generally, the degradable diversion material composition disclosed herein includes a polyacrylate compound (also referred to in the art as polyacrylic acid). The acrylic functionality and/or the main polymer chain may be unsubstituted or may be substituted with further functional groups. Non-limiting examples of other functional groups may be alkyl, cycloalkyl, alkenyl, amino, alkoxy, substituted aryl, or unsubstituted aryl functional groups. The polyacrylate compound may be non-cross-linked.

The polyacrylate compound of Formula I:

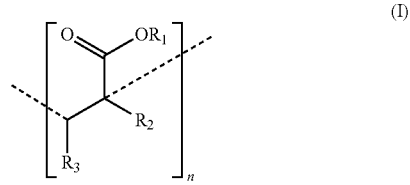

(I)

wherein $R_1$, $R_2$, and $R_3$ are independently selected from a group consisting of hydrogen, unsubstituted $C_1$-$C_6$ alkyl, substituted $C_1$-$C_6$ alkyl, unsubstituted aryl, or substituted aryl; and wherein the polyacrylate compound is non cross-linked.

Generally, $R_1$, $R_2$, and $R_3$ are independently selected from a group consisting of hydrogen, unsubstituted $C_1$-$C_6$ alkyl, substituted $C_1$-$C_6$ alkyl, unsubstituted aryl, or substituted aryl. In various embodiments, $R_1$, $R_2$, and $R_3$ are independently selected from a group consisting of hydrogen, unsubstituted $C_1$-$C_4$ alkyl, substituted $C_1$-$C_4$ alkyl, unsubstituted aryl, or substituted aryl. In some embodiments, $R_1$, $R_2$, and $R_3$ are independently selected from a group consisting of hydrogen, methyl, ethyl, n-propyl, iso-propyl, methoxy, ethoxy, propoxy, acetate, propionate, butyrate, methylamino, ethylamino, propylamino, iso-propylamino, or phenyl. In specific embodiments, $R_1$, $R_2$, and $R_3$ are hydrogen.

The polyacrylate may be formed from various acrylic monomers, as described above. Additionally, the polyacrylate may comprise one or more additional monomers such as acrylamide, 2-acrylamido-2-methylpropane sulfonic acid, or the like. In other embodiments, the polyacrylate may optionally comprise a copolymer or a terpolymer with at least one monomer of Formula II:

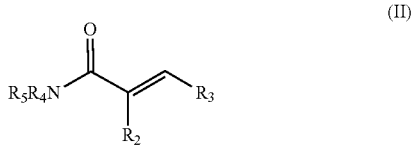

(II)

wherein $R_2$, $R_3$, $R_4$, and $R_5$ are independently selected from a group consisting of hydrogen, unsubstituted $C_1$-$C_6$ alkyl, substituted $C_1$-$C_6$ alkyl, unsubstituted aryl, or substituted aryl.

Generally, $R_2$, $R_3$, $R_4$, and $R_5$ are independently selected from a group consisting of hydrogen, unsubstituted $C_1$-$C_6$ alkyl, substituted $C_1$-$C_6$ alkyl, unsubstituted aryl, or substituted aryl. In various embodiments, $R_2$, $R_3$, $R_4$, and $R_5$ are independently selected from a group consisting of hydrogen, unsubstituted $C_1$-$C_4$ alkyl, substituted $C_1$-$C_4$ alkyl, unsubstituted aryl, substituted aryl. In some embodiments, $R_1$, $R_2$, and $R_3$ are independently selected from a group consisting of hydrogen, methyl, ethyl, n-propyl, iso-propyl, methoxy, ethoxy, propoxy, acetate, propionate, butyrate, methylamino, ethylamino, propylamino, or iso-propylamino, phenyl, or 2-methanepropane sulfonic acid. In specific embodiments, $R_1$, $R_2$, and $R_3$ are independently selected from a group consisting of hydrogen, methyl, ethyl, and 2-methanepropane sulfonic acid.

In some embodiments, diverter material may be made up of solely of a polyacrylate compound. In other embodiments, the diverter material is a combination of the polyacrylate compound and at least one other component, such as at least one inert filler. Non-limiting examples of inert filler may be calcium carbonate, sand, clay, graphite, manmade ceramics, polylactic acid (PLA), polyglycolic acid (PGA), polyterphthalates, and combinations thereof. As appreciated by the skilled artisan, the particular inert filler can and will vary depending on the specific application, the type of diversion needed, the subterranean temperature, and the type of well where the diversion material is employed.

The diverter material may be in the form of a particulate, and any shape, including finely divided particulate, beads, pellets, chips, powder, granules, flakes, fiber, ovoid, any other shape, or mixtures thereof. The polyacrylate diverter as a particulate may be dispersed in the carrier fluid.

The diverter material particles disclosed herein may be in the form of a composite, or nanocomposite. For instance, the polyacrylate along with another component, such as an inert filler may be a particulate, where each individual particle of the particulate is a composite or nanocomposite of the polyacrylate compound and the inert filler. The polyacrylate compound and the at least one inert filler may each themselves be in the form of smaller particles, which combined together form larger particles which forms the degradable diverter material disclosed herein.

The size of the particulate may vary depending on the downhole application or process in which the particulate may be used, and may be affected by the application or process used to prepare the particulate. The particle size of the particulate may range from micron size (~30 µm) to about ½ inch (~14 mm). The particle sizes of particulates may have a multimodal distribution, such as bimodal or trimodal, or have four or five or more modes. One distribution of particles may be in the range of from about 3 mm to about 5 mm, having from about 10% to about 70%, alternatively from 20% to 35% of the total particles, another distribution may have from about 0.85 mm to about 2.4 mm, another distribution may have from about 0.40 mm to less than about 0.85 mm, having from about 10% to about 70%, alternatively from 20% to 35% of the total particles, another distribution of from about 0.210 mm to less than about 0.40 mm having from about 10% to about 70%, alternatively from 20 to 35% of the total particles, another distribution from about 0.100 to less than about 0.180 having from about 10% to about 70%, alternatively from 20% to 35% of the total particles, another distribution from about 0.070 to less than about 0.100 having from about 10% to about 70%, alternatively from 20% to 35% of the total particles, another distribution from 30 µm to 70 µm having from about 10% to about 70%, alternatively from 20% to 35% of the total particles.

Each of the above distributions may be included together, or the distributions may be arranged to include some distributions while not including others. For instance, larger particles from 3 to 5 mm and 0.40 to 0.85 mm may be included for plugging perforations or fractures. Alternatively such larger particles may be excluded and instead smaller distributions having particle sizes less than 0.40 mm for use with smaller fractures, or microfractures, or to form a filter cake. The particle sizes and distributions may be modified depending on the wellbore, fractures, processes, and desired diversions.

(b) Carrier Fluid

The carrier fluid includes any fluid where the diverter material (and/or the polyacrylate in the diverter material) is initially insoluble and then may be soluble over time or upon dilution of the carrier fluid. The carrier fluid may be an aqueous base fluid with a salt, such as brine, and may be sufficiently saturated such that the diverter material herein does not dissolve in the carrier fluid. The carrier fluid may include a divalent salt. The divalent salt may include alkaline metals or transition metals, and may include elements capable of forming divalent ions. Non-limiting examples of useful divalent metals may be calcium ($Ca^{2+}$), magnesium ($Mg^{2+}$), barium ($Ba^{2+}$), zinc ($Zn^{2+}$), copper ($Cu^{2+}$), manganese ($Mn^{2+}$), and iron ($Fe^{2+}$) along with a suitable anion. Non-limiting examples of suitable anions may be acetates, acetyacetonates, alkoxides, butyrates, carbonyls, dioxides, chlorides, bromides, iodides, hexonates, hydrides, mesylates, octanates, nitrates, nitrosyl halides, nitrosyl nitrates, sulfates, sulfides, sulfonates, phosphates, trifluoromethanesulfonates, trimethylacetates, tosylates, and combinations thereof. In a preferred embodiment, suitable divalent salts may be calcium chloride ($CaCl_2$), magnesium chloride ($MgCl_2$), zinc chloride ($ZnCl_2$), or combinations thereof.

The concentration of the divalent salt(s) in the aqueous fluid may be such that the carrier fluid is saturated with the divalent salt, which may depend on the type of divalent salt, as well as temperature or other conditions. For instance, in practice the salt may be added in large amounts to an aqueous fluid until saturated. The diverter material, and in particular the polyacrylate, is insoluble or has low solubility in the carrier fluid when carrier fluid is saturated. The concentration may also be such that the fluid is not saturated, but sufficiently high that the diverter material is insoluble or has low solubility. The insolubility of the diverter material in the carrier fluid prevents degradation of the diverter material. The concentration of divalent salt(s) may be for instance from about 0.1% to about 20%, alternatively from about 0.5% to about 15%, alternatively from about 1% to about 10%, alternatively from about 1% to about 5%, alternatively from about 5% to about 10%, encompassing any value and subset therebetween. At higher temperatures, the concentration of the divalent salt(s) may be increased above the ranges depicted above.

The diverter material may remain insoluble or predominantly insoluble in the high salt concentration carrier fluid for from about 6 to about 24 hours, alternatively from about 1 to about 10 days, or at least about 7 days, or at least about 6 days, or alternatively at least about 3 days, or alternatively at least about 2 days, encompassing any value and subset therebetween. By insoluble or predominantly insoluble, the percent dissolution is less than about 20%, alternatively less than about 15%, alternatively less than about 10%, alternatively less than about 5%, alternatively less than about 2%, alternatively less than about 1%, alternatively about 0%. Upon exposure to dilute aqueous fluid such as tap water, freshwater, or water having low concentration of salt such as less than about 1.0%, the degradation of the diverter material may begin or degradation occur at a faster rate than in the brine or high concentration salt fluid. The dilute aqueous fluid may be injected from the surface or may be native downhole or subterranean fluid such as a formation fluid.

The diverter material may have delayed degradation in dilute aqueous fluids for a period of time subsequent to exposure to a high concentration carrier fluid such as one minute to two hours, alternatively from five minutes to one hour, alternatively from ten minutes to one hour, encompassing any value and subset therebetween. In such cases it may take hours, days or weeks to reach full dissolution, such as from about 6 to 24 hours, alternatively from 1 to about 10 days, or alternatively at least about 7 days, or alternatively at least about 6 days, or alternatively at least about 3 days, or alternatively at least about 2 days, encompassing any value and subset therebetween to reach dissolution of greater than 30%, alternatively greater than 50%, alternatively greater than 90%, alternatively greater than 95%, alternatively 100%. The time for dissolution in the dilute aqueous fluid may depend on the salt concentration of the carrier fluid and the length of time in which the diverter material was exposed to the carrier fluid, as well as the concentration of the dilute aqueous fluid. The length of degradation time may be varied based on downhole conditions and by varying the salt concentration of the carrier fluid. Accordingly, the degradation may be controlled and delayed so as to release over a period of time, such as a few hours, a few days, or a week, or sufficient time to carry out desired process(es) including a predetermined time period desired by operators of the well.

The diverter material may be mixed with a carrier fluid by mixing equipment and injected downhole. The carrier fluid may be the same as a treatment fluid from fracturing or any other process.

Degradation as disclosed herein includes any type of breaking down such as through dissolution, chemical reaction, or melting. Accordingly, when the diverter material is made up solely or predominantly of polyacrylate, or with a component that is also soluble in water, degradation may involve the full dissolution of the diverter material. When the diverter material is made up of an additional component which may not be soluble in water, the diverter material may degrade as the polyacrylyate dissolves thereby causing the diverter material to break.

(c) Polymer Gelling Agent

A polymer gelling agent may be optionally added to the degradable diverter material, namely the composite, to slow and/or control the degradation time of the degradable material. The polymer gelling agent can be mixed and extruded with the at least one particulate as part of the composite. The polymer gelling agent can be any water soluble polymer and/or water swellable polymer such as any saccharides such as guar, xanthan or diutan, as well as other water soluble polymers such as PVA, or polymers of acrylamides, acetates, esters, or other or any other natural/synthetic polymer that gels or thickens in water. The polymer gelling agent may act as an additional barrier between the composite and any aqueous fluid thereby inhibiting contact of water with the polyacrylate. This polymer gelling agents may assist in lengthening the dissolution time of the degradable diverter material. Moreover, inclusion of the polymer gelling agent may assist in storage of the degradable diverter material. Polyacrylic acid may be hygroscopic and so may absorb water at high humidity. Using the polymer gelling agent as an additive in the composite would help in controlling the hygroscopicity even when the material is stored at atmospheres with higher moisture content. The polymer gelling agent can be added from about 0 to 50%, alternatively from about 0 to 10%, alternatively from about 0.1% to 50%, alternatively from about 1% to 10%, encompassing any value and subset therebetween, the aforementioned values being a weight percentage.

(d) Introduction into the Wellbore

In various embodiments, the diverter material, for instance as a particulate, may be introduced as a solid, a semi-solid, a gel, a heterogeneous mixture, a homogeneous solution, or combinations thereof wherein the heterogeneous mixture or the homogeneous solution comprises a carrier fluid. Optionally, a polymer gelling agent may be included. In some embodiments, the diverter material may be injected into the wellbore as a solid or semi-solid. After this injection, carrier fluid or treatment fluid may then be added to the wellbore. In other embodiments, the diverter material may be premixed with an acceptable carrier before injection into the wellbore, and may be formed as a slurry with the diverter material as a particulate dispersed in the carrier fluid. In still other embodiments, a polymer gelling agent may be premixed with at least one particulate using normal mixing equipment before injecting into the wellbore. Generally, an effective amount of the diverter material may be injected into the wellbore to effectively cause a diversion. The operator of the well would readily understand the amount of the diversion material, or the diversion material and the carrier fluid needed.

Generally, the relative amount of the diverter material in the carrier fluid may range from 0.01 lbs./gallon to about 10 lbs./gallon. In various embodiments, the amount of the diverter material in the carrier fluid may range from 0.01 lbs./gallon to about 10 lbs./gallon, from 0.1 lbs./gallon to about 7.5 lbs./gallon, from 0.5 lbs./gallon to about 5.0 lbs./gallon, or from 1.0 lbs./gallon to about 2.0 lbs./gallon, encompassing any value and subset therebetween.

(e) Mechanism of Diverter Material

In various embodiments, the diverter material may be a polyacrylate compound alone. In other embodiments, the diverter material may be a combination of polyacrylate compound, an inert filler, and optionally a polymer gelling agent. These materials may be combined into a composite. As described above, while the polyacrylate is water soluble, the at least one inert filler may be water insoluble, and together the degradation via dissolution of the composite may be controlled and delayed so as to release over a period of time, such as a few hours, a few days, or a week including a predetermined time period desired by operators of the well. Additionally, an optional polymer gelling agent may be added to the degradable diverter material to delay degradation via dissolution. The polymer gelling agent may swell in the presence of water and act as a barrier preventing or inhibiting contact of the diverter material with water.

As a result of degradation, the polyacrylate may flow to the surface dissolved in the aqueous downhole fluid. Furthermore, as a result of degradation of the composite, the at least one inert filler as individual particles may flow back to the surface or may serve as proppant in one or more micro-fractures or fractures.

Illustrative Diversion Processes

The degradable diverter material may be used to temporarily block the formation permeability and divert any fluid present downhole, including fluids already in the formation or wellbore, or any subterranean region, as well as any fluid injected from the surface.

The degradable diverter material may be employed in any process requiring diversion. Such processes may include fracturing, gravel packing, acid diversion, fluid loss control, conformance operations, scale control, water control, sand control, or any completion or stimulation processes. A particular process may include hydraulic fracturing. In such case the degradable diverter material may be pumped in separate stages before, during, after, or at the tail end of fracturing and proppant placement stages. For instance, a fracturing process may begin with a plurality of perforations being made in a vertical or horizontal well at one or more intervals in one or more zones. After the perforation stage, a fracturing stage can be carried out. For instance a treatment fluid may be injected at high pressure to cause fractures in the perforated regions or other regions in the well. A proppant may be injected with the treatment fluid during or after the fracturing stage. The degradable diverter material may be provided during these stages or after in order to divert fluid and block or reduce the formation permeability. The degradable material may agglomerate in the wellbore, perforation or fracture or pores of the formation to divert fluid downhole. This may be done by forming a filter cake on the surface of formation which diverts the incoming fluid to other untreated locations or prevents the loss of fluid. The degradable diverter material may also form a plug in the fractures or perforations. Upon plugging, an additional fracturing stage can be conducted whereby fluid is diverted by the degradable diverter material to pressurize and fracture other perforations or deepen other fractures.

The degradable diverter material may be mixed with a carrier fluid by mixing equipment and injected downhole. The carrier fluid may be the same as a treatment fluid from fracturing or any other process. The carrier fluid and treatment fluid may be water or an aqueous or water based fluid. The aqueous base fluid includes water, deionized water, water with trace elements, saltwater, seawater, brine, freshwater, and the like. The brine may be filtered brine or "clear brine."

After a treatment, or during well shut-in, the degradable diverter material, which may be a filter cake or a plug formed from composite particulate, may be in continuous, semi-continuous or occasional contact with the water based fluid from the surface or which may already be present downhole. Due to this contact with water, dissolution of polyacrylate from the composite occurs thereby causing degradation. Once a sufficient amount of polyacrylate dissolves in water, the remaining portion comprising the inert filler will disintegrate or disassociate and will be ready to flow back into the wellbore or act as a proppant. When this disintegration happens at the formation face it may not hamper the permeability of the formation.

Generally, the degradable material may begin to dissolve at relatively low temperatures, from ambient temperature to 270° F. In various embodiments, the temperature where the degradable material may begin to dissolve may be from ambient temperature (~20° F.) to about 270° F., from 40° F. to about 220° F., from 60° F. to 180° F., or from 80° F. to about 120° F. The degradable materials would be useful in low temperature wells wherein the temperature of the subterranean formation is about 100° F.

Illustrations

The exemplary methods and compositions disclosed herein may directly or indirectly affect one or more components or pieces of equipment associated with the preparation, delivery, recapture, recycling, reuse, and/or disposal of the disclosed compositions. The degradable diverter material of the present disclosure can be employed in a wide variety of oil and gas and downhole applications, for example, as part of a hydraulic fracturing process. Although in the following figures and description, a fracturing process is described, the use of the presently disclosed composition is not limited to these applications but can be used in a wide variety of applications.

Lab dissolution experiments were initially conducted to determine the utility of utilizing a polyacrylate compound in diversion operations. Polyacrylic acid (PAA) is readily soluble in fresh water and in solutions of monovalent salts, while it is much less soluble in divalent salts. Table 1 illustrates the solubility of PAA in various concentrations of the divalent salt $CaCl_2$. As shown in the first set of tests, the solubility of PAA is very low in 1, 5 and 10% $CaCl_2$, even after 6 or 7 days. For the second set of tests, the PAA was first placed in the various $CaCl_2$ solutions for a period of time (simulating surface mixing and placement downhole). The particles were then transferred to tap water and held for various times. As shown, for the tests held in $CaCl_2$ for one hour the ultimate % dissolution in tap water decreased as the initial $CaCl_2$ concentration increased. Also, for the 10% $CaCl_2$ solution decreasing the initial hold time to 10 minutes resulted in a final dissolution of 100% in tap water. Thus it appears the final dissolution of this material can be controlled by the mixing various brine concentration and holding times.

TABLE 1

PAA Dissolution Experiments with $CaCl_2$

| Test Fluid | Test Time (days) | % Dissolution |
|---|---|---|
| 1% $CaCl_2$ | 6 | 11 |
| 5% $CaCl_2$ | 7 | 2 |
| 10% $CaCl_2$ | 7 | 0 |
| 1% $CaCl_2$ for one hour, then transfer to tap water | 6 | 94 |
| 5% $CaCl_2$ for one hour, then transfer to tap water | 7 | 29 |
| 10% $CaCl_2$ for one hour, then transfer to tap water | 7 | 20 |
| 10% $CaCl_2$ for 10 minutes, then transfer to tap water | 3 | 100 |

Figure 2:
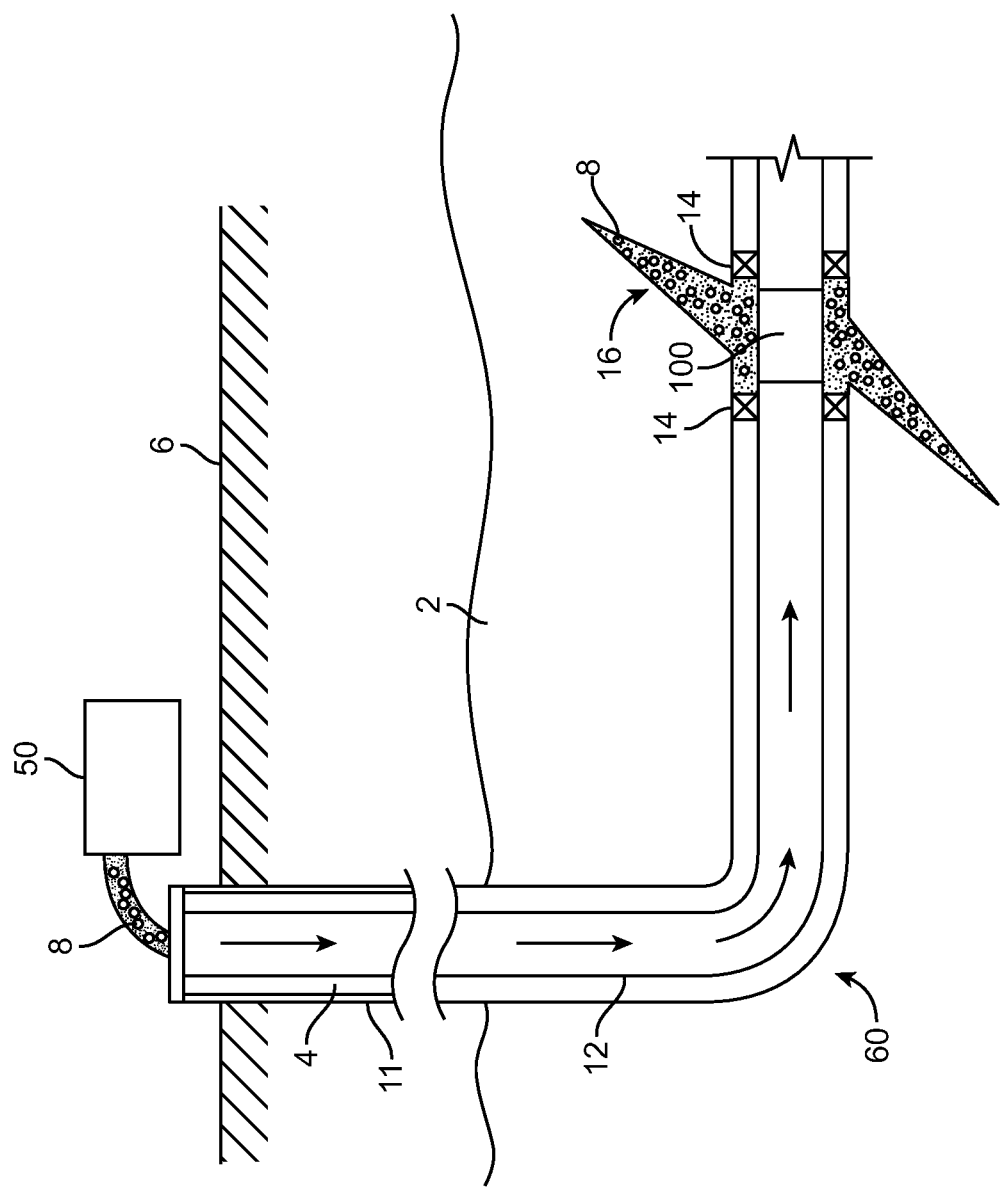
FIG. 2 is a diagram illustrating an example of a subterranean formation in which a fracturing operation may be performed in association with certain aspects of the present disclosure.

An exemplary fracturing system is illustrated in FIGS. 1 and 2. In this example, the system 10 includes a degradable diverter material 70. The degradable diverter material 70 may be the degradable nanocomposite particulate as described herein. The system 10 includes a mixing apparatus 20, a fluid source 30, a proppant source 40, and a pump and blender system 50 and resides at the surface at a well site where a wellbore 60 is located. The fluid source 30 may include the aqueous base fluid as disclosed herein. In certain instances, the mixing apparatus 20 combines the degradable diverter material 70 with the fluid source 30 which therefore serves as the carrier fluid for the degradable diverter material 70. In certain instances, the other components may be added such as a hydrocarbon fluid, a polymer gel, foam, air, microparticles, nanoparticles, breakers, wet gases and/or other fluids and additives.

The pump and blender system 50 receives the binding composition and combines it with other components, including proppant from the proppant source 40 to form a treatment fluid, namely a fracturing fluid. Suitable proppants disclosed for the present disclosure may be any hard particulate that may prop open a fracture downhole, including any fine or coarse solid particles, gravel, sand, desert sand, beach sand, brown sand, white sand, fly ash, silica four, microproppants, ceramic beads, glass beads, bauxite, sintered bauxite, sized calcium carbonate, ceramic, gravel, glass, polymer materials, polytetrafluoroethylene materials, nut shell pieces, walnut shell fragments, cured resinous particulates having nut shell pieces, seed shell pieces, cured resinous particulates having seed shell pieces, fruit pit pieces, cured resinous particulates having fruit pit pieces, wood, composite particulates, and any combination thereof.

The resulting mixture may be pumped down the wellbore 60 and out through a downhole tool, such as tool 100 shown in FIG. 2, or through perforations or apertures of a casing or tubing, under a pressure sufficient to create or enhance one or more fractures in a subterranean zone, for example, to stimulate production of fluids from the zone. Notably, in certain instances, the binding composition producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can prepare and distribute the fracturing fluid to the target subterranean zone.

FIG. 2 illustrates a fracturing operation being performed on a portion of a subterranean formation of interest 2 surrounding a well bore 4 at wellbore 60. The well bore 4 extends from the surface 6, and the fracturing fluid 8 is applied to a portion of the subterranean formation 2 surrounding the horizontal portion of the well bore through, for example, a downhole tool 100. The tool 100 can include ports, holes, or a sleeve which permits exit of fluid from the work string 12. Alternative to the tool 100, the fracturing fluid 8 may be applied via perforations or other apertures in a casing 11 (when the casing extends that far), work string 12, other piping, or merely directly into the formation. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting, and/or other tools.

The well is shown with a work string 12 depending from the surface 6 into the well bore 4. The pump and blender system 50 is coupled to the work string 12 to pump the fracturing fluid 8 into the well bore 4. The work string 12 may include coiled tubing, jointed pipe, and/or other structures that allow fluid to flow into the well bore 4. The work string 12 can include flow control devices that control the flow of fluid from the interior of the work string 12 into the subterranean zone 2.

The work string 12 and/or the well bore 4 may include one or more sets of packers 14 that seal the annulus between the work string 12 and well bore 4 to define an interval of the well bore 4 into which the fracturing fluid 8 will be pumped. FIG. 2 shows two packers 14, one defining an uphole boundary of the interval and one defining the downhole end of the interval. When the fracturing fluid 8 is introduced into well bore 4 at a sufficient hydraulic pressure, one or more fractures 16 may be created in the subterranean zone 2. The proppant particulates in the fracturing fluid 8 may enter the fractures 16 where they may remain after the fracturing fluid flows out of the well bore. These proppant particulates may "prop" fractures 16 such that fluids may flow more freely through the fractures 16.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Statements of the Disclosure Include:

Statement 1: A method comprising:
a) introducing a degradable diverter material into a wellbore penetrating a subterranean formation, the degradable diverting material comprising a polyacrylate compound;
b) allowing the degradable diverting material to divert at least a portion of a fluid present downhole; and
c) allowing the degradable diverter material to at least partially degrade.

Statement 2: The method of Statement 1, wherein the polyacrylate compound comprises the compound of Formula I

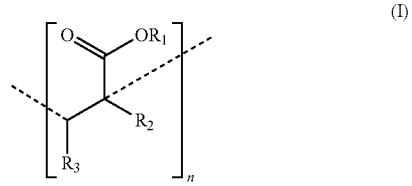

wherein $R_1$, $R_2$, and $R_3$ are independently selected from a group consisting of hydrogen, unsubstituted $C_1$-$C_6$ alkyl, substituted $C_1$-$C_6$ alkyl, unsubstituted aryl, or substituted aryl; and wherein the polyacrylate compound is non cross-linked.

Statement 3: The method of Statement 1 or Statement 2, wherein the at least one particulate optionally comprises a copolymer, or a terpolymer with at least monomer of Formula II:

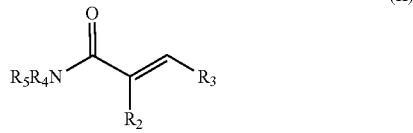

wherein $R_2$, $R_3$, $R_4$, and $R_5$ are independently selected from a group consisting of hydrogen, unsubstituted $C_1$-$C_6$ alkyl, substituted $C_1$-$C_6$ alkyl, unsubstituted aryl, or substituted aryl.

Statement 4: The method according to any one of the preceding Statements 1 to 3, wherein the degradable diverter material is introduced into the wellbore as a solid, a semi-solid, a gel, a heterogeneous mixture, or a homogeneous solution, wherein the heterogeneous mixture or the homogeneous solution comprises a carrier fluid.

Statement 5: The method according to any one of the preceding Statements 1 to 4, wherein the carrier fluid is salt saturated and comprises divalent brine.

Statement 6: The method of Statement 5, wherein the polyacrylate compound is insoluble or has limited solubility in the carrier fluid and wherein the amount of the degradable material ranges from about 0.01 lbs/gallon to about 10 lbs/gallon.

Statement 7: The method of Statement 6, wherein less than 10% of the polyacrylate compound dissolves in 6 days in the carrier fluid.

Statement 8: The method according to any one of the preceding Statements 1-7, wherein the degradable diverter material comprises an inert filler and wherein the inert filler is selected from a group consisting of calcium carbonate, sand, clay, graphite, man-made ceramics, polylactic acid (PLA), polyglycolic acid (PGA), polyterphthalates, or combinations thereof.

Statement 9: The method according to any one of the preceding Statements 1 to 8, wherein the degradable diverter material is in particulate form and had multimodal particle size distribution.

Statement 10: The method according to any one of the preceding claims 1-9, wherein degradation comprises dissolution of the polyacrylate compound in a downhole aqueous fluid.

Statement 11: The method according to any one of the preceding claims 1-10, further comprising mixing the polyacrylate compound with the carrier fluid using mixing equipment before or during introduction into the wellbore, and wherein the degradable diverter material is introduced into the subterranean formation using one or more pumps.

Statement 12: A degradable diversion material particulate composition, the composition comprises:
a) at least one particulate comprising a polyacrylate compound of Formula (I):

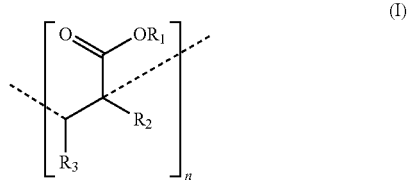

b) a divalent brine; and
c) an optional particulate inert filler.
wherein $R_1$, $R_2$, and $R_3$ are independently selected from a group consisting of hydrogen, unsubstituted $C_1$-$C_6$ alkyl, substituted $C_1$-$C_6$ alkyl, unsubstituted aryl, or substituted aryl; and wherein the polyacrylate compound is non cross-linked.

Statement 13: The composition of Statement 12, wherein the polyacrylate further comprises a copolymer, or at least one terpolymer with at least one monomer of Formula (II):

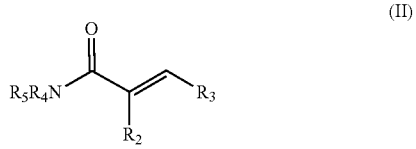

wherein $R_2$, $R_3$, $R_4$, and $R_5$ are independently selected from a group consisting of hydrogen, unsubstituted $C_1$-$C_6$ alkyl, substituted $C_1$-$C_6$ alkyl, unsubstituted aryl, or substituted aryl.

Statement 14: The composition of Statement 12, wherein the divalent metal in the divalent brine is selected from a group consisting of calcium ($Ca^{2+}$), magnesium ($Mg^{2+}$), barium ($Ba^{2+}$), zinc ($Zn^{2+}$), copper ($Cu^{2+}$), manganese ($Mn^{2+}$), iron ($Fe^{2+}$), and combinations thereof.

Statement 15: The composition according to any one of the preceding Statements 12 to 14, wherein the at least one particulate comprising a polyacrylate compound is insoluble in a saturated aqueous divalent brine solution.

What is claimed is:

1. A method comprising:
   a) introducing a degradable diverter material in a carrier fluid into a wellbore penetrating a subterranean formation, the degradable diverter material comprising a polyacrylate compound;
   b) allowing the degradable diverter material to divert at least a portion of a fluid present downhole; and
   c) allowing the degradable diverter material to at least partially degrade;
   wherein the carrier fluid is salt saturated and comprises divalent brine;
   wherein the polyacrylate compound is insoluble in the carrier fluid.

2. The method of claim 1, wherein the polyacrylate compound comprises the compound of Formula I

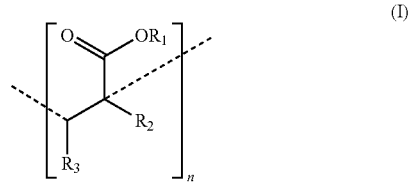

(I)

wherein $R_1$, $R_2$, and $R_3$ are independently selected from a group consisting of hydrogen, unsubstituted $C_1$-$C_6$ alkyl, substituted $C_1$-$C_6$ alkyl, unsubstituted aryl, or substituted aryl; and
wherein the polyacrylate compound is non cross-linked.

3. The method of claim 1, wherein the degradable diverting material comprises a copolymer, or a terpolymer with at least one monomer of Formula II:

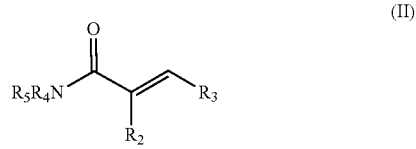

(II)

wherein $R_2$, $R_3$, $R_4$, and $R_5$ are independently selected from a group consisting of hydrogen, unsubstituted $C_1$-$C_6$ alkyl, substituted $C_1$-$C_6$ alkyl, unsubstituted aryl, or substituted aryl.

4. The method of claim 1, wherein the degradable diverter material is introduced into the wellbore as a solid, a semi-solid, a gel, a heterogeneous mixture, or a homogeneous solution, wherein the heterogeneous mixture or the homogeneous solution comprises the carrier fluid.

5. The method of claim 1, wherein the amount of the degradable diverter material ranges from about 0.01 lbs/gallon to about 10 lbs/gallon.

6. The method of claim 1, wherein less than about 10% of the polyacrylate compound dissolves in 6 days in the carrier fluid.

7. The method of claim 1, wherein the degradable diverter material comprises an inert filler, and wherein the inert filler is selected from a group consisting of calcium carbonate, sand, clay, graphite, man-made ceramics, polylactic acid (PLA), polyglycolic acid (PGA), polyterephthalates, or combinations thereof.

8. The method of claim 1, wherein the degradable diverter material is in particulate form and has a multimodal particle size distribution.

9. The method of claim 1, wherein degradation comprises dissolution of the polyacrylate compound in a downhole aqueous fluid.

10. The method of claim 1, further comprising mixing the polyacrylate compound with the carrier fluid using mixing equipment before or during introduction into the wellbore, and wherein the degradable diverter material is introduced into the subterranean formation using one or more pumps.

* * * * *